United States Patent
Gadiot

(10) Patent No.: US 7,360,355 B1
(45) Date of Patent: Apr. 22, 2008

(54) LONG RANGE ARTILLERY SHELL

(75) Inventor: Guillaume M. H. J. L. Gadiot, Risjwik (NL)

(73) Assignee: QinetiQ Limited, London (GB)

( * ) Notice: Subject to any disclaimer, the term of this patent is extended or adjusted under 35 U.S.C. 154(b) by 1826 days.

(21) Appl. No.: 08/658,493

(22) Filed: Jun. 7, 1996

(51) Int. Cl.
*F02K 9/36* (2006.01)

(52) U.S. Cl. .................. 60/255; 60/256; 102/380; 102/439; 102/490

(58) Field of Classification Search .......... 102/374, 102/376, 490, 439, 473, 380; 60/253, 255, 60/256
See application file for complete search history.

(56) References Cited

U.S. PATENT DOCUMENTS

| | | | | |
|---|---|---|---|---|
| 2,489,953 A | * | 11/1949 | Burney | 102/380 |
| 3,404,532 A | * | 10/1968 | Olstein | 102/380 |
| 3,434,419 A | * | 3/1969 | Dimond et al. | 102/374 |

FOREIGN PATENT DOCUMENTS

| | | | | |
|---|---|---|---|---|
| FR | 2522134 | * | 8/1983 | 102/490 |
| GB | 676368 | * | 7/1952 | 102/374 |
| GB | 877504 | | 9/1961 | |
| GB | 2049891 A | | 12/1980 | |
| SE | 124185 | * | 3/1949 | 102/374 |

* cited by examiner

*Primary Examiner*—Stephen M Johnson
(74) *Attorney, Agent, or Firm*—Nixon & Vanderhye P.C.

(57) ABSTRACT

A long range artillery shell having a rocket motor which comprises a combustion chamber (shown filled with solid propellant 9, burn inhibitor 10, igniter material 13 and propellant support 11,12) which has at one end a plenum chamber 8 and a rocket nozzle 14 for venting the plenum chamber 8. The propellant 9 is arranged in an end-burn configuration and housed within the combustion chamber and the propellant support 11,12 is located between the propellant 9 and the plenum chamber 8 and is capable of preventing entry of unburnt propellant into the plenum chamber 8 while permitting, in use, the substantially unhindered transfer of propellant combustion products to the plenum chamber 8.

9 Claims, 3 Drawing Sheets

FIG. 2a
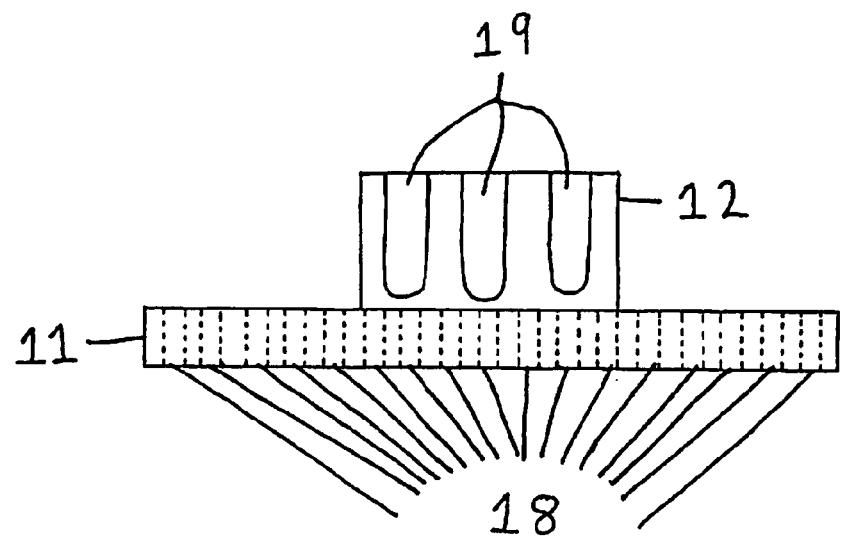
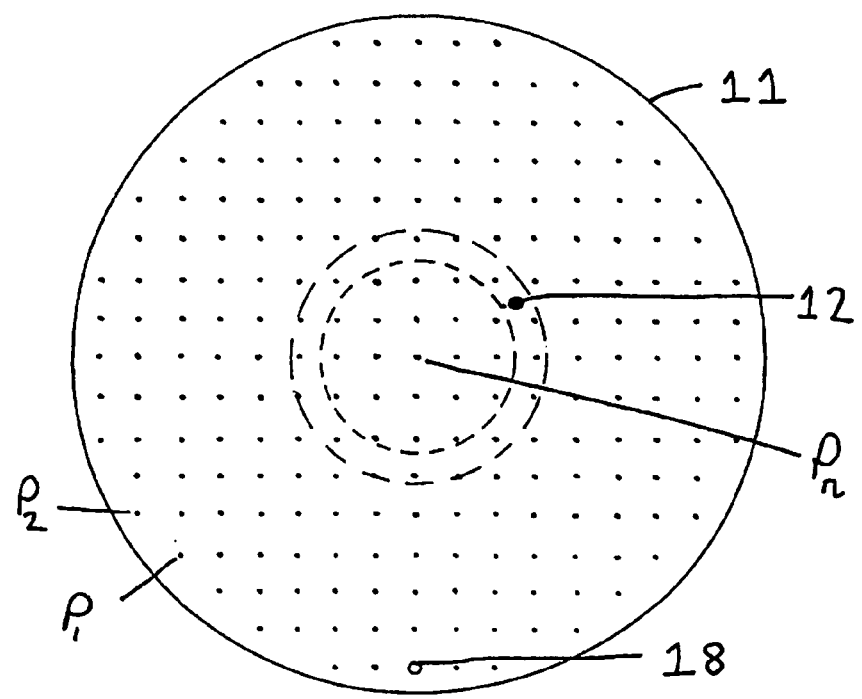
FIG. 2b

LONG RANGE ARTILLERY SHELL

BACKGROUND OF THE INVENTION

1. Field of the Invention

This invention relates to a long range artillery shell having a rocket motor.

2. Discussion of Prior Art

There is a constant military requirement to extend the range of artillery shells with minimum effect on the payload and the delivery system. In practice this requires the general physical shape of the conventional shell to be maintained since if the long range artillery shell conforms closely to the mass and external dimensions of the conventional shell it may then be delivered using existing ordnance without exceeding the maximum acceptable breech pressure.

One method to increase the range of a shell is to provide that shell with a rocket motor which is ignited after the round has left the barrel to provide additional impulse to the shell, thereby increasing its range.

Rocket motors are well known for missile systems. For example, UK patent GB676368 discloses a missile with a rocket motor having a propellant arranged in an end burn configuration in a combustion chamber, an axially arranged exhaust nozzle and a number of canted or cambered vanes to interact with the exhaust gases and impart a degree of spin to the missile.

Missiles, however, are generally relatively high cost munitions, a large part of the volume of which is rocket motor, and are launched by ignition of the rocket motor. Ignition takes place before any launch stresses have been encountered and all of the energy imparted to the missile derives from the rocket motor whereas an artillery shell, which is relatively cheap and incorporates a large volume for payload, is fired by a gun and any rocket motor is not ignited until after launch. The launch accelerations experienced by artillery shells (approximately 16,000 g) may be over 200 times greater than those experienced in missile systems. These high axial loads during launch of an artillery shell would cause movement and deformation of the propellant in a rocket motor which could result in failure of the motor to ignite after launch or catastrophic failure of the shell.

Conventionally the rocket motor used in a long range shell comprises a solid propellant configured with a central cavity which extends axially throughout the length of the propellant, forming a plenum chamber. In such a configuration the propellant burns from the cavity outwards to act as a so called internal or perforated grain propellant. The gaseous combustion products produced by this burning then exit the rocket through a nozzle in the rear of the motor casing.

However one problem associated with this type of rocket motor is that the perforated grain propellant may deform when subjected to the high axial acceleration loads experienced during launch. In so deforming the solid propellant may develop a crack or may deform plastically to close up the central cavity. In either case, misfunction of the motor and sometimes catastrophic failure of the shell can result.

One solution to this problem of deformation is to divide the propellant into a series of smaller length grains, along the axis of the shell and separated from one another by supports having a central hole to allow passage of the gaseous combustion products to the nozzle. However, this solution introduces the additional problem that the volume of the combustion chamber available for propellant is decreased by these supports. This results in either a reduced payload or a reduced range if the mass and external dimensions of a conventional shell are to be retained.

SUMMARY OF THE INVENTION

It is an aim of the present invention to provide a long range artillery shell in which at least some of the aforementioned problems are alleviated.

According to the present invention there is provided a long range artillery shell comprising a payload, a rocket motor and a rocket motor delay mechanism for delaying ignition of the rocket motor for a predetermined time after launch of the shell wherein the rocket motor comprises a combustion chamber, a plenum chamber located at one end of the combustion chamber, a rocket nozzle for venting the plenum chamber, a solid rocket propellant being arranged in an end-burn configuration and housed within the combustion chamber and a propellant support located between the propellant and the plenum chamber wherein the propellant support is adapted to prevent substantial movement of the propellant during launch, to prevent entry of unburnt propellant into the plenum chamber and to permit in use the substantially unhindered transfer of propellant combustion products to the plenum chamber.

By providing a solid propellant without a central cavity the level of the axial acceleration load which the propellant can withstand is increased over that of a propellant formed from the same material but with a central cavity. During launch the propellant is supported and prevented from substantial movement by the propellant support, overcoming the tendency for the propellant to move backwards and close up the plenum chamber which would produce incorrect ignition. Problems with inconsistent burning are removed as the propellant support also serves to prevent substantial amounts of unburnt propellant from entering the plenum chamber to adversely effect the burning characteristics of the rocket motor. Moreover, by providing only one support for the propellant the volume of combustion chamber available for propellant is maximised.

Rocket assistance to the shell is most effectively employed when the shell enters the less dense air of the stratosphere since the velocity increase is maximised in the low density atmosphere. Therefore by delaying the ignition of the rocket motor until the shell reaches the low density air the effectiveness of the rocket assistance is maximised. It will be apparent to those skilled in the art that the time taken for the shell to reach this region is dependent on the trajectory of the shell and on the velocity with which the shell leaves the breech and may be calculated using known mathematical modelling.

Rocket motor ignition may be effected by a pyrotechnic delay through a rocket motor nozzle plug of the type commonly employed within rocket assisted shells to seal off the combustion chamber from the high temperature and high pressure gases present in the gun barrel during firing. In use the pyrotechnic delay is ignited by the high temperature gases present after firing and is designed to provide the required delay before burning through to the rocket motor igniter and causing the rocket propellant to ignite.

In order for the rocket motor to function the support must be permeable and may for example be fabricated from a permeable material or may comprise a plate of substantially impermeable material having a multiplicity of perforations made through it. This sieve-like plate permits substantially unhindered passage of combustion products between the propellant and the plenum chamber when the rocket motor is fired.

The rocket nozzle generally comprises a cone portion and a throat portion and in use the propellant combustion products are vented from the plenum chamber through the throat portion of the rocket nozzle to exit the rocket motor through the cone portion. Thus, in order to achieve correct functioning of the rocket motor it is advantageous to arrange for the total area of free space defined by the perforations to be at least that defined by the throat of the rocket nozzle and preferably at least twice that defined by the throat of the rocket nozzle. It will be apparent to a person skilled in the art that if each perforation is made too large then significant amounts of propellant may be extruded through the perforation and into the plenum chamber to cause misfunction of the rocket motor. It will also be apparent that if made too small then the perforations may become blocked by solid combustion products, such as particulate metals formed when using some known propellant materials, which again may cause misfunction of the rocket motor.

In a preferred embodiment the propellant support comprises a perforated plate and cooperable load transfer means which is adapted to transfer a proportion of the axial acceleration loads experienced during launch to the walls of the plenum chamber. This reduces the loads which the perforated plate must be capable of withstanding thereby allowing a relative reduction in the thickness of the plate. This has the advantage that more propellant may be accommodated within the combustion chamber.

The perforated plate and load transfer means may be of unitary design or alternatively the load transfer means may comprise a separate cylindrical load ring arranged concentrically with the perforated plate.

Conveniently the cylindrical load ring may be a cylindrical support located in the plenum chamber and extend longitudinally from the perforated plate to the rearward wall of the combustion chamber. Preferably the cylindrical support is provided with a plurality of slots to facilitate venting of the exhaust gases from the plenum chamber through the exhaust nozzle.

Most usefully the long range artillery shell may also include a base bleed system. Such systems are common in the art and are effective at reducing base drag when the shell is moving at high velocity through the relatively dense air found during the initial stages of flight.

BRIEF DESCRIPTION OF THE DRAWINGS

The invention will now be described by way of example only with reference to the figures of the accompanying drawings in which:

FIGS. 2a and 2b are a representative of the propellant support showing a) a side elevation and b) an end elevation.

DETAILED DISCUSSION OF PREFERRED EMBODIMENTS

Figure 1:
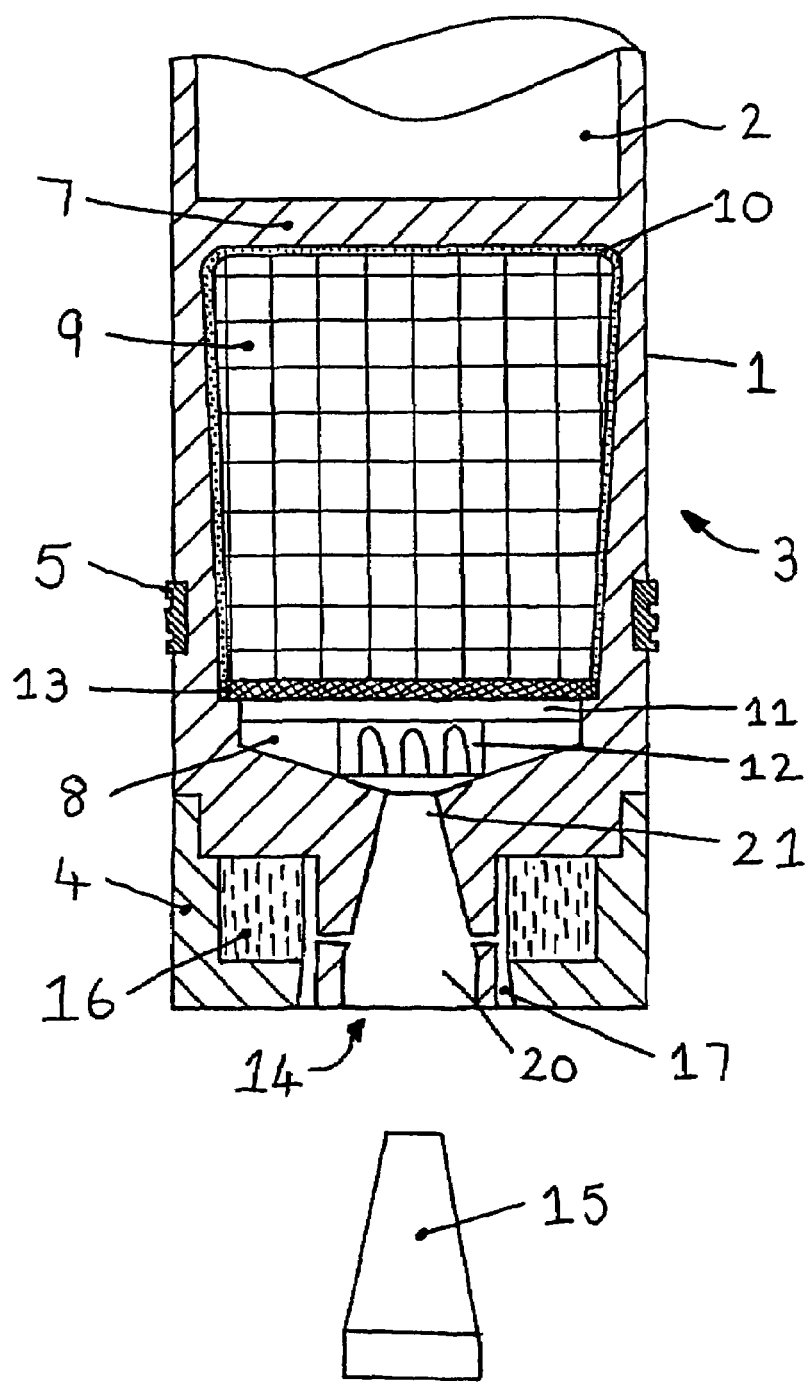
FIG. 1 is a cross sectional view of the rear part of a long range artillery shell according to the present invention.

Referring now to FIG. 1 a 155 mm artillery shell is shown which generally comprises a payload volume 2, a rocket motor 3 and base bleed unit 4 and a driving band 5.

The payload volume 2 and the combustion chamber (shown containing propellant 9, burn inhibitor 10 and igniter material 13) are separated by a bulkhead 7 with the combustion chamber being defined by the wall of the shell 1. The volume of the combustion chamber is reduced towards the end distal from the bulkhead 7 to form a plenum chamber 8.

A single grain of rocket propellant 9, having been previously cast in a burn inhibitor 10, is configured to fill the majority of the volume of the combustion chamber. The propellant 9 is prevented from entering the plenum chamber 8 by a thin perforated plate 11 and associated load ring 1-2. A layer of igniter material 13 for igniting the exposed end face of the propellant 9 is provided between the plate 11 and the propellant 9. The plenum chamber 8 can be vented by the rocket nozzle 14. The rocket nozzle 14 comprises a cone portion 20 and a throat portion 21, the latter connecting the plenum chamber 8 to the cone portion 20. A rocket nozzle plug 15 is also provided and is shown separated from the rocket nozzle 14 for clarity. The base bleed unit 4 is separate from the rocket motor 3 and comprises an annularly arranged base bleed propellant 16 and base bleed nozzle 17.

The rocket propellant material must be suitable for processing, have a high specific impulse and possess reliable mechanical properties over a wide temperature range. For these reasons the aluminised rubbery composite hydroxy terminated polybutadiene (HTPB) may be chosen. This material is configured into an end burning grain rocket propellant 9 by casting it into a burn inhibitor 10. This inhibitor 10 may comprise an open ended cup made from metal, noryl (elastomeric plastic) or Kevlar filled Ethylene propylene diene monomer (EPDM) rubber and acts to inhibit the burning of the propellant 9 at surfaces other than the exposed end face. The igniter material 13 may suitably comprise a matrix of a number of layers, each comprising a PTFE substrate coated with between 4 to 6 microns of vapour deposited magnesium as described generally in the UK patent GB 2 251 434 B, arranged to cover substantially all of the exposed end face of the propellant 9.

Referring now to FIGS. 2a and 2b, the propellant support 11,12 comprises a 6 mm thick, 113 mm diameter plate 11 formed from a high yield strength material such as steel conforming to the ANSI 4340 standard (yield strength of approximately 1900 MPa). This plate 11 is provided with some 190, 3 mm diameter holes 18, having centres at points $P_1 \ldots {}_n$ relatively evenly dispersed across the faces of the plate 11 at about 6 mm intervals to form a sieve like structure as indicated in FIG. 2b.

A cylindrical load ring 12 of between 42 and 48 mm diameter is arranged concentrically with the plate 11. In use this load ring 12 serves to transfer load from the plate 11 to the walls of the shell 1 which serve to define the plenum chamber 8. Slots 19 are provided in this load transfer ring 12 to facilitate the free flow of escaping propellant combustion products after the rocket motor propellant 9 is ignited.

Figure 3:
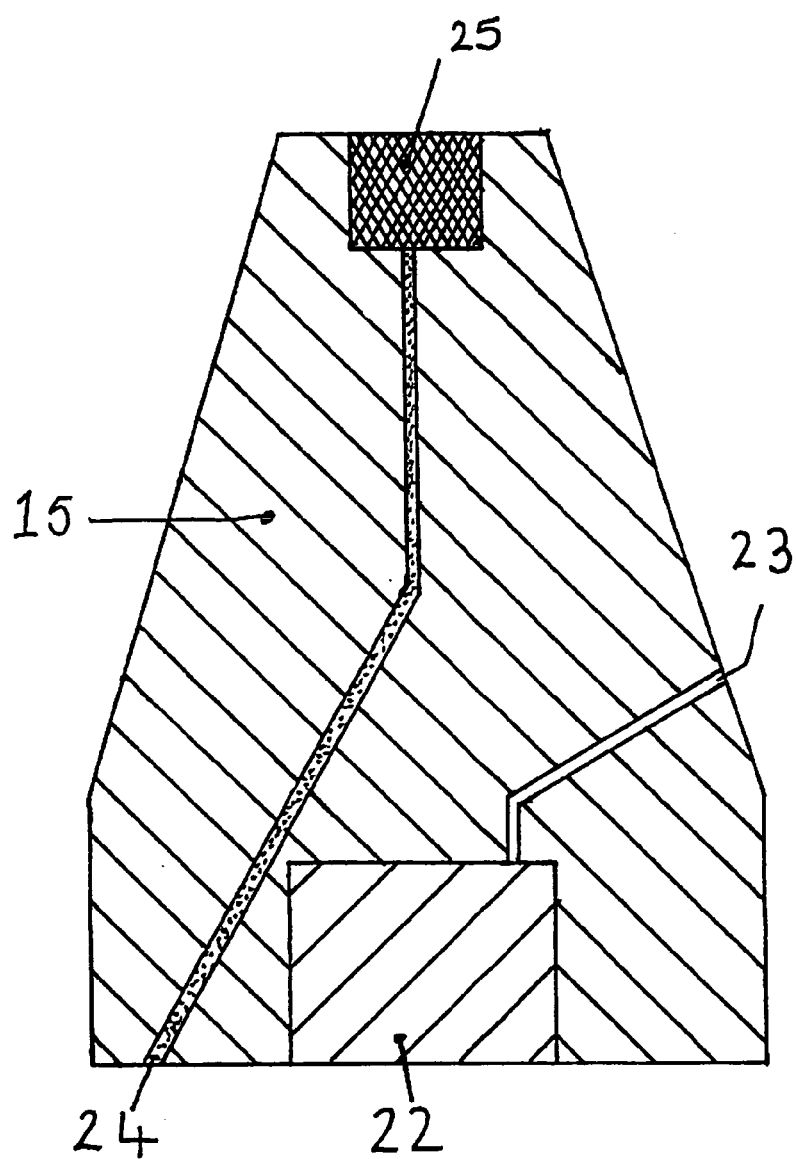
FIG. 3 is a cross sectional view of a rocket nozzle plug.

The rocket motor nozzle plug 15 is shown in more detail in FIG. 3. The Plug 15 provides both a base bleed ignition means and a rocket motor ignition delay mechanism. A mass of base bleed ignition composition 22, typically a blend of magnesium, PTFE and a copolymer of hexafluoropropylene and vinylidene fluoride, is provided and has several radial flash holes 23 extending outwards therefrom. A pyrotechnic delay charge is shown schematically at 24 and extends frog the rear surface of the plug 15 to a transfer charge 25 at the front surface of the plug 15.

In use the hot gases produced in the barrel at launch ignite both the base bleed ignition composition 22 and the pyrotechnic delay 24. Ignition of the base bleed propellant 16 is initiated and sustained by the flash transfer through the flash holes 23 in the plug 15. The pyrotechnic delay 24 is designed to burn for a longer predetermined time (typically between 20 and 30 seconds for a 155 mm artillery shell) to ignite the transfer charge 25 when the base bleed propellant 16 has substantially finished burning. The transfer charge 25 is designed to burn to release sufficiently hot combustion products into the plenum chamber 8 and through the propellant support 11,12 to ignite the igniter material 13. It will be apparent to those skilled in the art that a take-over charge (not shown) may be additionally provided within the plenum chamber to be ignited by and to take over from the hot combustion products produced by the transfer charge 25 so as to ignite the igniter material 13. This would provide a more reliable ignition mechanism for the ignition of the igniter material 13.

Although the present invention is exemplified with reference to a 155 mm artillery shell it will be appreciated by those skilled in the art that the invention is applicable for use with other calibre shells.

The invention claimed is:

1. A long range artillery shell including a payload, said shell comprises:
    a combustion chamber;
    a plenum chamber located at one end of the combustion chamber;
    a rocket nozzle for venting the plenum chamber;
    a solid rocket propellant being arranged in an end-burn configuration and housed within the combustion chamber;
    propellant ignition delay mechanism for delaying ignition of said propellant a predetermined time after launch of said shell; and
    a propellant support located between the propellant and the plenum chamber, said propellant support adapted to prevent substantial movement of the propellant during launch, to prevent entry of unburnt propellant into the plenum chamber and to permit substantially unhindered transfer of propellant combustion products to the plenum chamber.

2. A long range artillery shell as claimed in claim 1 wherein the propellant support comprises a perforated plate of substantially impermeable material having a multiplicity of perforations therethrough.

3. A long range artillery shell as claimed in claim 2 wherein the propellant support additionally comprises a load transfer means adapted to transfer a proportion of the axial acceleration loads experienced during launch from the perforated plate to the walls of the plenum chamber.

4. A long range artillery shell as claimed in claim 3 wherein the load transfer means consists of a load ring arranged concentric with and abutting the perforated plate.

5. A long range artillery shell as claimed in claim 4 wherein the load ring is a cylindrical support located in the plenum chamber, extending longitudinally from the perforated plate to the rearward wall of the combustion chamber.

6. A long range artillery shell as claimed in claim 5 wherein the cylindrical support is provided with a plurality of slots.

7. A long range artillery shell as claimed in claim 6 wherein there is additionally provided a base bleed system.

8. A long range artillery shell including a payload, said shell comprises:
    a combustion chamber;
    a plenum chamber located at one end of the combustion chamber;
    a rocket nozzle for venting the plenum chamber;
    a solid rocket propellant being arranged in an end-burn configuration and housed within the combustion chamber;
    propellant ignition delay mechanism at least initially located in said nozzle for ignition of said propellant a predetermined time after launch of said shell; and
    a propellant support located between the propellant and the plenum chamber, said propellant support adapted to prevent substantial movement of the propellant during launch, to prevent entry of unburnt propellant into the plenum chamber and to permit substantially unhindered transfer of propellant combustion products to the plenum chamber.

9. A long range artillery shell as claimed in claim 8, further including a base bleed system comprising:
    base bleed propellant ignition by launch of said shell; and
    at least one base bleed nozzle through which combustion products of said base bleed propellant pass.

* * * * *